United States Patent
Nagasawa et al.

(10) Patent No.: US 8,471,680 B2
(45) Date of Patent: Jun. 25, 2013

(54) TURNTABLE FOR DISPLAY UNIT AND CONTROL METHOD THEREFOR

(75) Inventors: Masato Nagasawa, Tokyo (JP); Katsutoshi Okada, Tokyo (JP); Yoshiki Nagaoka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 551 days.

(21) Appl. No.: 12/425,066

(22) Filed: Apr. 16, 2009

(65) Prior Publication Data

US 2009/0261985 A1    Oct. 22, 2009

(30) Foreign Application Priority Data

Apr. 17, 2008    (JP) .................. 2008-107506

(51) Int. Cl.
| | |
|---|---|
| G08B 5/22 | (2006.01) |
| G08B 23/00 | (2006.01) |
| G05B 23/02 | (2006.01) |
| G05B 19/00 | (2006.01) |
| H04N 7/18 | (2006.01) |
| H04L 17/02 | (2006.01) |
| G06F 17/00 | (2006.01) |
| G06F 5/00 | (2006.01) |

(52) U.S. Cl.
USPC ............. 340/6.1; 340/3.7; 340/5.3; 340/500; 340/693.12; 348/94; 348/95; 341/176; 345/418; 345/156

(58) Field of Classification Search
None
See application file for complete search history.

(56) References Cited

U.S. PATENT DOCUMENTS

| | | | | |
|---|---|---|---|---|
| 5,250,888 | A | | 10/1993 | Yu |
| 5,347,387 | A | * | 9/1994 | Rice .............................. 398/129 |
| 5,471,296 | A | * | 11/1995 | Parker et al. ............. 356/139.06 |
| 6,108,035 | A | * | 8/2000 | Parker et al. ................... 348/169 |
| 6,348,928 | B1 | * | 2/2002 | Jeong ............................ 345/649 |
| 6,642,506 | B1 | * | 11/2003 | Nahum et al. ........... 250/231.13 |

(Continued)

FOREIGN PATENT DOCUMENTS

| | | |
|---|---|---|
| CN | 1862707 A | 11/2006 |
| EP | 1722561 A2 | 11/2006 |

(Continued)

*Primary Examiner* — Daniel Wu
*Assistant Examiner* — Emily C Terrell
(74) *Attorney, Agent, or Firm* — Birch, Stewart, Kolasch & Birch, LLP

(57) ABSTRACT

The invention provides an automatically rotatable turntable for a display unit and includes: a mounting section mounted with the display unit; an electric rotating mechanism that rotates the mounting section; a reception section in the display unit which receives a wireless signal from a remote control unit; and a control section that controls the electric rotating mechanism based upon the received wireless signal. Upon receipt of the wireless signal, the control section detects a reception strength of the reception section while cyclically rotating the mounting section around a predetermined rotational position, to initially detect a rotational position at which the reception strength is maximum. Thereafter, as a main operation, the control section detects the reception strength while rotating the mounting section in a direction extending from the predetermined rotational position to the initially-detected rotational position, to detect a rotational position at which the reception strength is maximum.

17 Claims, 12 Drawing Sheets

U.S. PATENT DOCUMENTS

| | | | |
|---|---|---|---|
| 6,931,596 B2 * | 8/2005 | Gutta et al. | 715/728 |
| 7,023,499 B2 * | 4/2006 | Williams et al. | 348/836 |
| 7,151,967 B2 * | 12/2006 | Chen et al. | 700/56 |
| 7,296,774 B2 * | 11/2007 | Oh | 248/324 |
| 7,750,590 B2 * | 7/2010 | Takaji et al. | 318/470 |
| 7,864,159 B2 * | 1/2011 | Sweetser et al. | 345/158 |
| 2004/0021702 A1 * | 2/2004 | Lucaci et al. | 345/864 |
| 2006/0262213 A1 * | 11/2006 | Chung | 348/333.06 |
| 2007/0210223 A1 * | 9/2007 | Lee et al. | 248/178.1 |
| 2008/0079604 A1 * | 4/2008 | Madonna et al. | 340/825.72 |
| 2010/0001893 A1 * | 1/2010 | Kim et al. | 341/176 |

FOREIGN PATENT DOCUMENTS

| | | |
|---|---|---|
| JP | 2-51190 A | 2/1990 |
| JP | 2-206812 | 8/1990 |
| JP | 08-123353 | 5/1996 |
| JP | 2001-285755 | 10/2001 |
| JP | 2007-047233 | 2/2007 |
| KR | 1997-20154 | 5/1997 |
| KR | 2006-105985 A | 10/2006 |
| TW | I264627 B | 10/2006 |

* cited by examiner

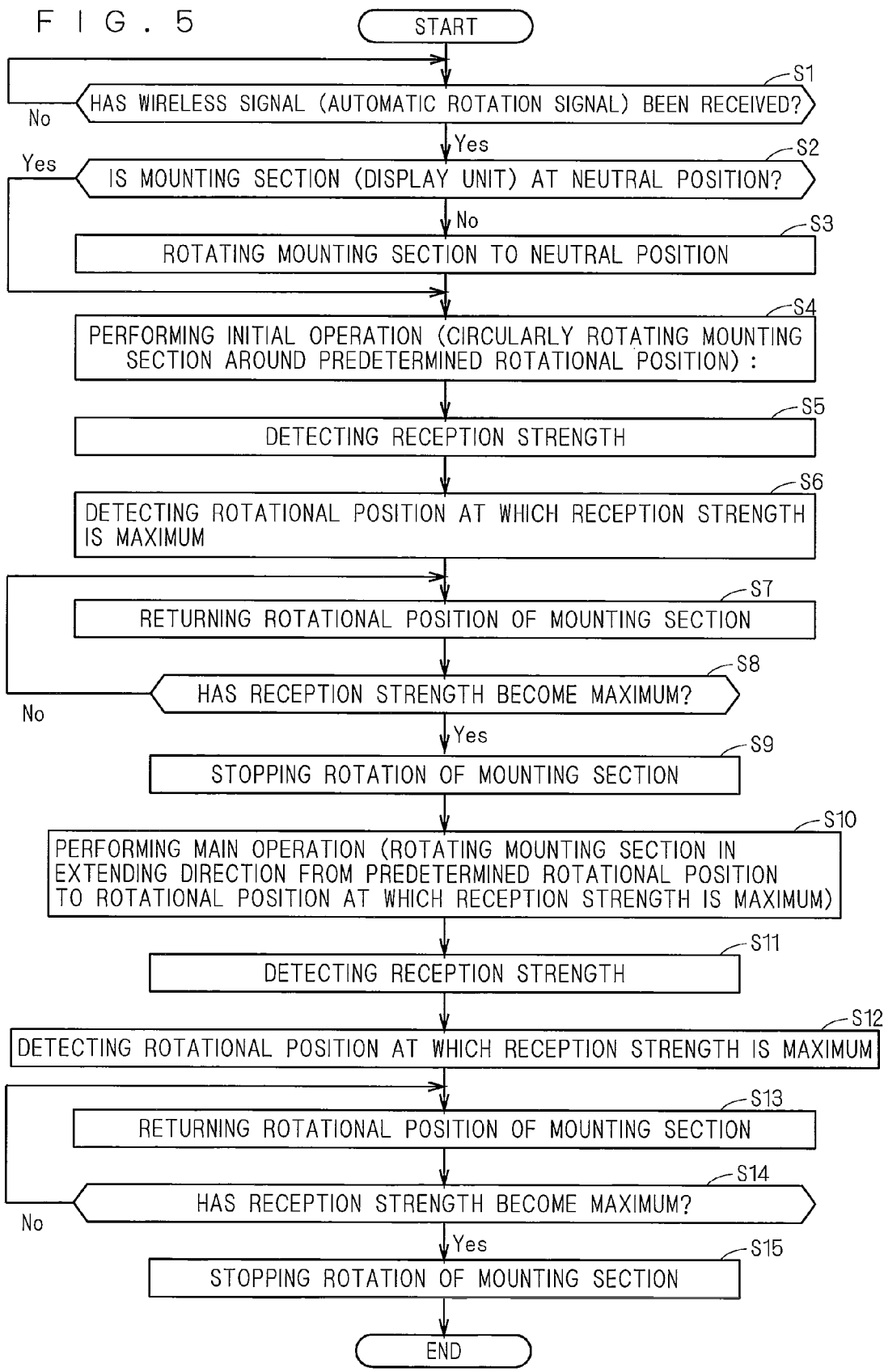

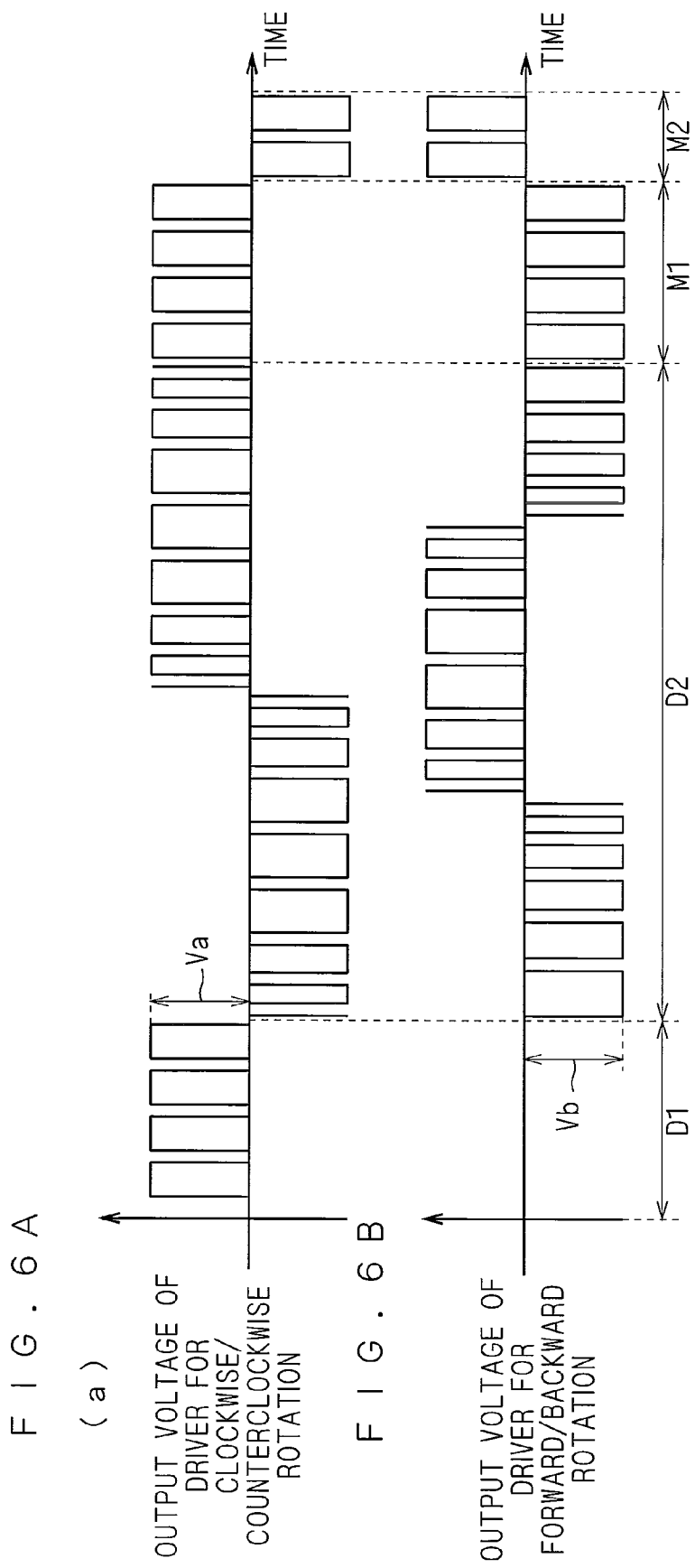

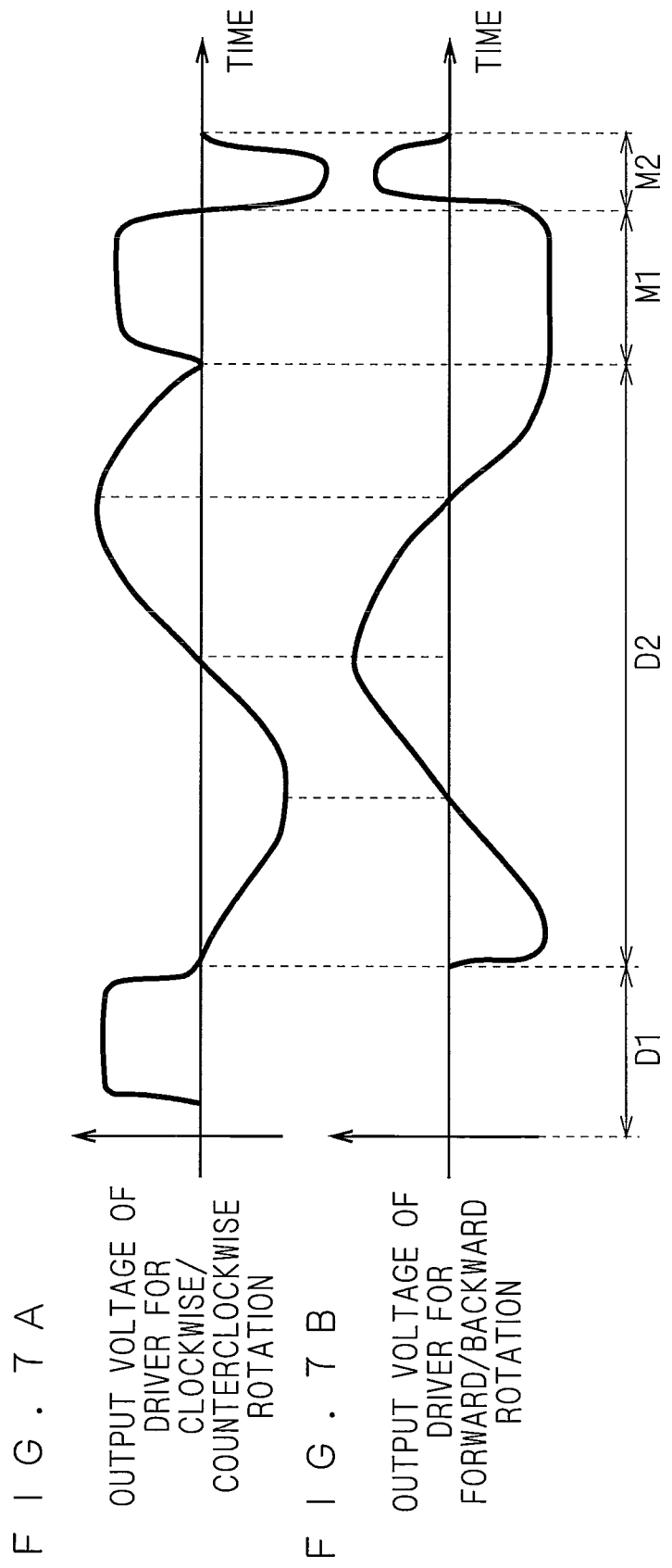

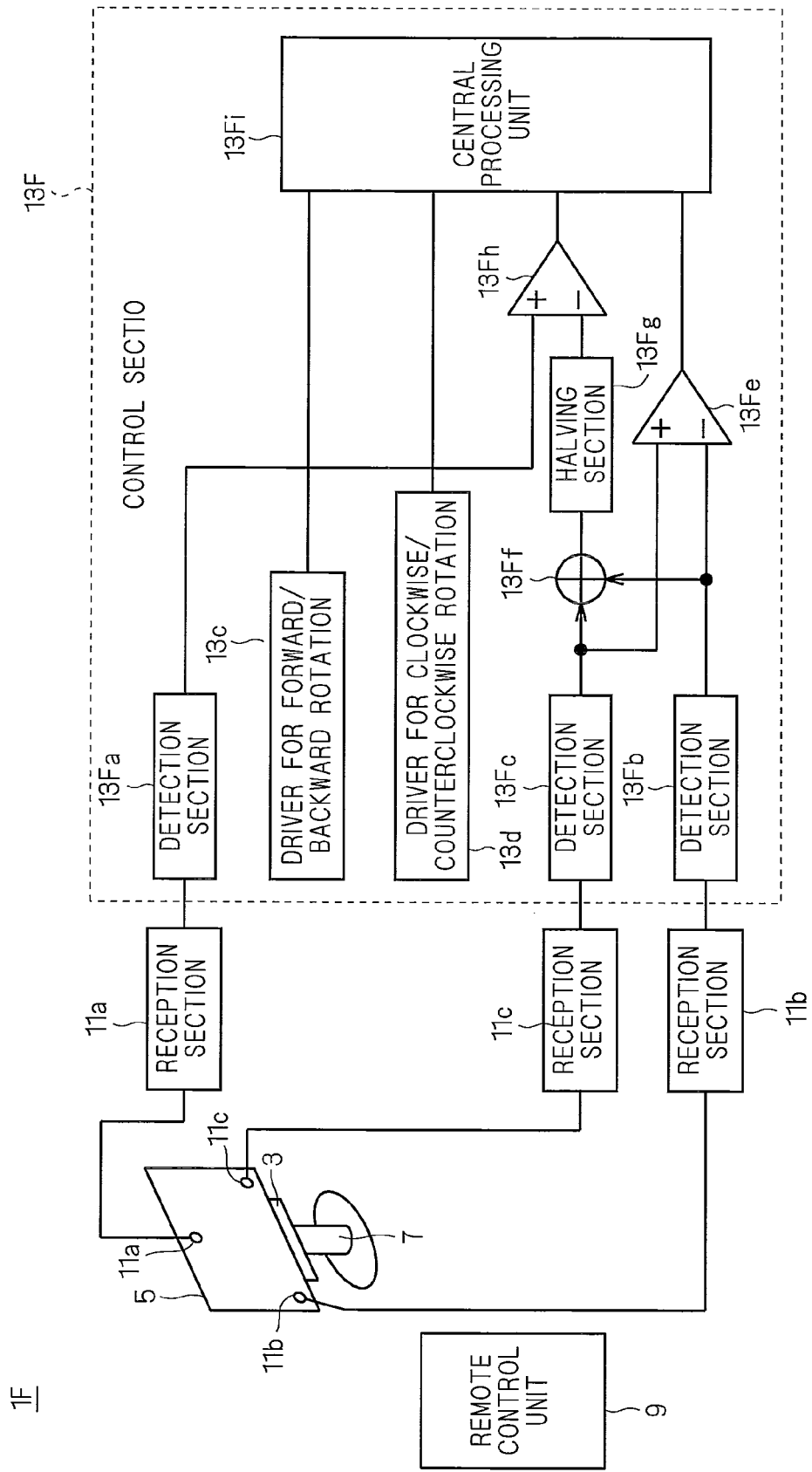

TURNTABLE FOR DISPLAY UNIT AND CONTROL METHOD THEREFOR

BACKGROUND OF THE INVENTION

1. Field of the Invention

The present invention relates to a turntable for a display unit, which adjusts an orientation of a display unit by means of a wireless signal from a remote control unit.

2. Description of the Background Art

In a conventional turntable for a display unit of this kind, a rotating direction and an amount of rotation of a mounting section mounted with a display unit have been specified using a cross key, or the like, installed on a remote control unit, to adjust an orientation of the display unit by means of a wireless signal from the remote control unit.

There has been a problem in this case such that, since an operator of the display unit needs to specify the rotating direction and the amount of rotation, remote-control operations for specifying those are burdensome for the operator.

As for a technique for solving this problem, Japanese Patent Application Laid-Open No. H2-206812 has been disclosed.

In Japanese Patent Application Laid-Open No. 2-206812, a focus detecting sensor is installed on the front surface of a display unit, the presence of a person ahead of the display unit is detected with the focus detecting sensor while an orientation of the display unit is rotated, and the rotation is stopped at the detection, thereby to automatically adjust the orientation of the display unit in a direction to the person present ahead of the display unit.

In the case of Japanese Patent Application Laid-Open No. 2-206812, there has been a problem in that the manufacturing cost is high due to the use of the focus detecting sensor.

There has further been a problem in that, when a person being not the operator of the display unit or an obstacle is present in the vicinity of the display unit, the orientation of the display unit is adjusted in a direction to that person or the obstacle.

SUMMARY OF THE INVENTION

The present invention was made for solving the problems as described above, and has an object to provide a turntable for a display unit which is capable of automatically adjusting an orientation of the display unit in a direction to its operator.

A first aspect of the present invention includes: a mounting section that is mounted with a display unit; an electric rotating mechanism that rotates the mounting section; a remote control unit that transmits a wireless signal; a reception section that is installed in the mounting section or the display unit, and receives a wireless signal from the remote control unit; and a control section that controls the electric rotating mechanism based upon the wireless signal received in the reception section, wherein, upon receipt of a wireless signal from the remote control unit in the reception section, as an initial operation, the control section detects a reception strength of the wireless signal in the reception section while cyclically rotating the mounting section around a predetermined rotational position through the electric rotating mechanism, to detect a rotational position at which the reception strength is maximum among the detected results, and as a main operation, the control section detects the reception strength of the wireless signal in the reception section while rotating the mounting section in a direction extending from the predetermined rotational position to the rotational position at which the reception strength is maximum, to detect a rotational position at which the reception strength is maximum among the detected results, and rotates the mounting section to the rotational position at which the reception strength is maximum.

According to the first aspect of the present invention, it is possible to automatically adjust the orientation of the display unit in a direction to the remote control unit (thus, the direction to the operator of the display unit). Further, it is possible to detect a propagation direction of the wireless signal from the remote control unit by use of one reception section, so as to reduce manufacturing cost. Moreover, since the propagation direction of the wireless signal from the remote control unit is schematically detected by the initial operation and the mounting section is rotated in the propagation direction by the main operation, it is possible to prevent unnecessary rotation of the mounting section (accordingly, display unit) at the time of the main operation, so as to promptly rotate the display unit in the direction to the operator. Furthermore, since the mounting section is circularly rotated around the predetermined rotational position by the initial operation, it is possible to detect the propagation direction of the wireless signal from the remote control unit with respect to each of forward/backward and clockwise/counterclockwise rotating directions.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a flowchart of the operation of the turntable 1 for a display unit according to Embodiment 1.

FIGS. 6A and 6B are example views of waveforms of output voltages of respective drivers 13c, 13d in the case of FIG. 2 (waveforms in the case of PWM (Pulse Width Modulation) drive).

FIGS. 7A and 7B are example views of waveforms of the output voltages of the respective drivers 13c, 13d in the case of FIG. 2 (waveforms in the case of changing magnitudes of the output voltages).

FIG. 11 is a view showing an example of the reception strength of the reception section 11 in a case where a plurality of maximum value points appear in regard to the reception strength of the reception section 11 due to a shake of a remote control unit 9 or the like.

FIG. 14 is a constitutional schematic view of a turntable 1F for a display unit according to Embodiment 6.

DESCRIPTION OF THE PREFERRED EMBODIMENTS

Embodiment 1

Figure 1:
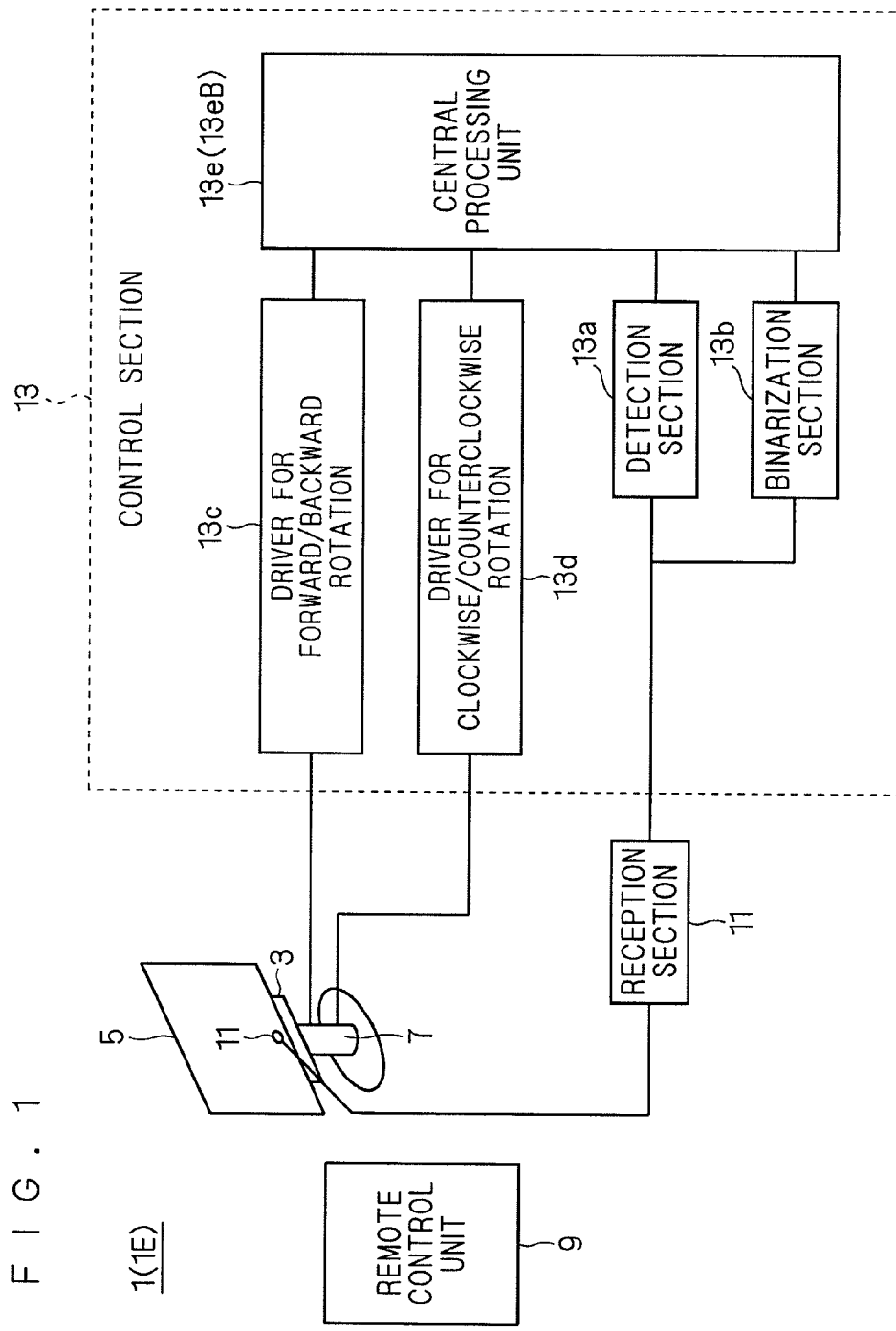
FIG. 1 is a constitutional schematic view of a turntable 1 for a display unit according to Embodiment 1.

As shown in FIG. 1, a turntable 1 for a display unit according to the present embodiment is provided with: a mounting section 3; a display unit 5 mounted on the mounting section 3; an electric rotating mechanism 7 that rotates the mounting section 3; a remote control unit 9 that transmits a wireless signal (e.g. infrared signal); a reception section 11 that is installed in the mounting section 3 or the display unit 5 and receives a wireless signal from the remote control unit 9; and a control section 13 that controls the electric rotating mechanism 7 based upon the wireless signal received in the reception section 11.

The electric rotating mechanism 7, for example, serves to rotate the mounting section 3 forward/backward and clockwise/counterclockwise. The electric rotating mechanism 7 is made up of a forward/backward rotating mechanism that rotates the mounting section 3 forward/backward around a horizontal axis, and a clockwise/counterclockwise rotating mechanism that rotates the mounting section 3 clockwise/counterclockwise around a vertical axis. Each of the forward/backward rotating mechanism and the clockwise/counterclockwise rotating mechanism is provided with an electric motor and driven by the electric motor.

One reception section 11 is installed on the front surface of the mounting section 3 or on the front surface of the display unit. For example in the case of the wireless signal from the display unit 5 being an infrared signal, the reception section 11 is configured as a photo-sensor that senses an infrared light.

The control section 13 includes: a detection section 13a that detects the wireless signal received in the reception section 11; a binarization section 13b that binarizes the wireless signal received in the reception section 11; a driver 13c for forward/backward rotation, which controls the forward/backward rotating mechanism of the electric rotating mechanism 7; a driver 13d for clockwise/counterclockwise rotation, which controls the clockwise/counterclockwise rotating mechanism of the electric rotating mechanism 7; and a central processing unit (CPU) 13e that controls the respective drivers 13c, 13d based upon the respective output signals from the detection section 13a and the binarization section 13b.

Based upon the output signal of the binarization 13b, the central processing unit 13e determines whether or not the wireless signal received in the reception section 11 is a control signal (hereinafter referred to as an automatic rotation signal) indicating automatic rotation of the display unit 5 in a direction to the remote control unit 9.

Further, upon receipt of the automatic rotation signal from the binarization section 13b, the central processing unit 13e controls the electric rotating mechanism 7 through each of the drivers 13c, 13d, to return the rotational state of the mounting section 3 to a neutral position (a position at which the display unit 5 faces the front).

Then, as an initial operation, the central processing unit 13e detects a reception strength of the wireless signal received in the reception section 11 based upon the output signal from the detection section 13a while controlling the electric rotating mechanism 7 through each of the derivers 13c, 13d to cyclically rotate the mounting section 3 around the neutral position (predetermined rotational position), to detect a rotational position at which the reception strength is maximum among the detected result.

Subsequently, as a main operation, the central processing unit 13e detects the reception strength of the wireless signal received in the reception section 11 based upon the output signal from the detection section 13a while rotating the mounting section 3 in an extending direction from the neutral position to the rotational position at which the reception strength is maximum, to detect the rotational position at which the reception strength is maximum among the detected results, and rotates the mounting section 3 to the rotational position at which the reception strength is maximum.

Next, an operation of this turntable 1 for a display unit is described based upon FIG. 5.

In the turntable 1 for a display unit, by pressing an automatic rotation button provided on the remote control unit 9, an orientation of the display unit 5 is automatically rotated in the direction to the remote control unit 9 in a manner as described below.

In Step S1, when the automatic rotation button on the remote control unit 9 is long-pressed with the remote control unit 9 pointed at the turntable 1 for a display unit, the wireless signal from the remote control unit 9 continues to be transmitted toward the turntable 1 for a display unit. The wireless signal is then received in the reception section 11 of the turntable 1 for a display unit, and the control section 13 of the turntable 1 for a display unit determines whether or not the reception signal is an automatic rotation signal.

In the case of the reception signal being the automatic rotation signal, in Step S2, the control section 13 determines whether or not the rotational state of the reception section 11 (thus the display unit 5) is the neutral position. As a result of the determination, in the case of the rotational state being the neutral position, the process goes to Step S4. On the other hand, in the case of the rotational state not being the neutral position, in Step S3, the control section 13 controls the electric rotating mechanism 7, to return the rotational state of the mounting section 3 to the neutral position. The process then goes to Step S4.

In Steps S4, S5, as the initial operation, the control section 13 detects a reception strength of the wireless signal received in the reception section 11 while cyclically rotating (e.g. circularly rotating) the mounting section 3 around the neutral position through the electric rotating mechanism 7. More specifically, for example as in FIG. 2, as a preparation operation D1, the mounting section 3 is rotated by a predetermined distance, for example, in the clockwise/counterclockwise rotating direction from a neutral position O to a start position of P1 of the cyclical rotation. Then, as an initial operation D2, as in FIG. 2, the mounting section 3 is circularly rotated with the neutral position O taken as the center from the start position P1, and returned again to the start position P1, and simultaneously, as in FIG. 3, the reception strength of the wireless signal received in the reception section 11 is detected by the control section 13 during the circular rotation.

In Step S6, the control section 13 detects a rotational position PA, at which the reception strength is maximum among the detected results (that maximum reception strength is referred to as TA).

In Steps S7 to S9, the control section 13 returns the rotational position of the mounting section 3 such that the reception strength of the reception section 11 is the maximum reception strength, thereby to rotate the mounting section 3 to the rotational position PA.

Figure 2:
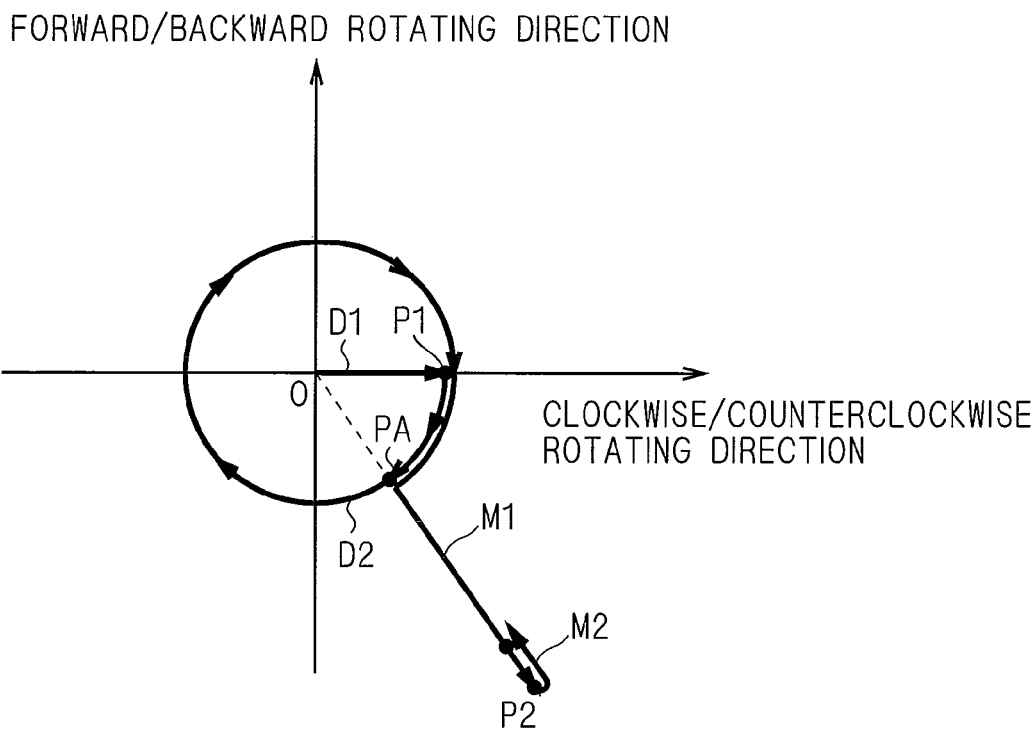
FIG. 2 is a view schematically showing an example of an operation of the turntable 1 for a display unit according to Embodiment 1 (the case of a mounting section being cyclically rotated in an initial operation).
Figure 3:
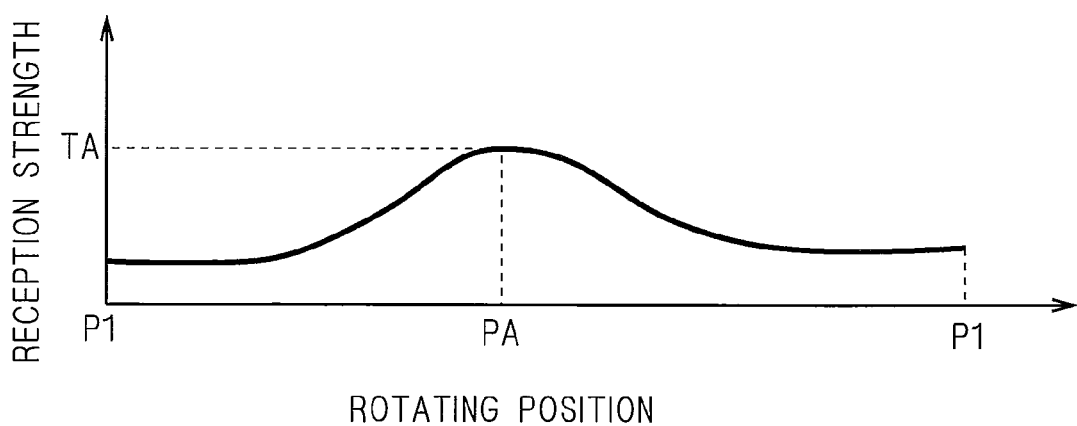
FIG. 3 is a view showing a reception strength of a wireless signal in a reception section 11 during the initial operation of FIG. 2.
Figure 4A:
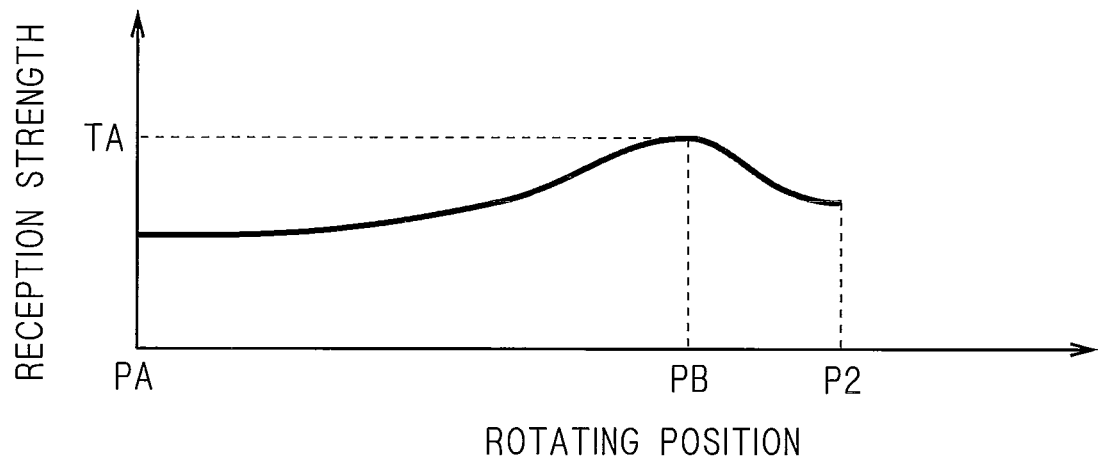
FIG. 4A is a view showing the reception strength of the wireless signal in the reception section 11 during a main operation of FIG. 2.

In Steps S10 to S12, as the main operation (first main operation M1), the control section 13 detects the reception strength of the wireless signal received in the reception section 11 as in FIG. 4A while rotating the mounting section 3 in an extending direction from the neutral position O to the rotational position PA as in FIG. 2, to detect a rotational position PB at which the reception strength is maximum among the detected results (that maximum reception strength is referred to as TB). It is to be noted that in this main operation M1, the rotation is performed until detection of the maximum reception strength or so long as the rotation is possible in the extending direction (e.g. to a rotational position P2). The rotational position PB detected in such a manner is a propagation direction of the wireless signal from the remote control unit 9.

Figure 4B:
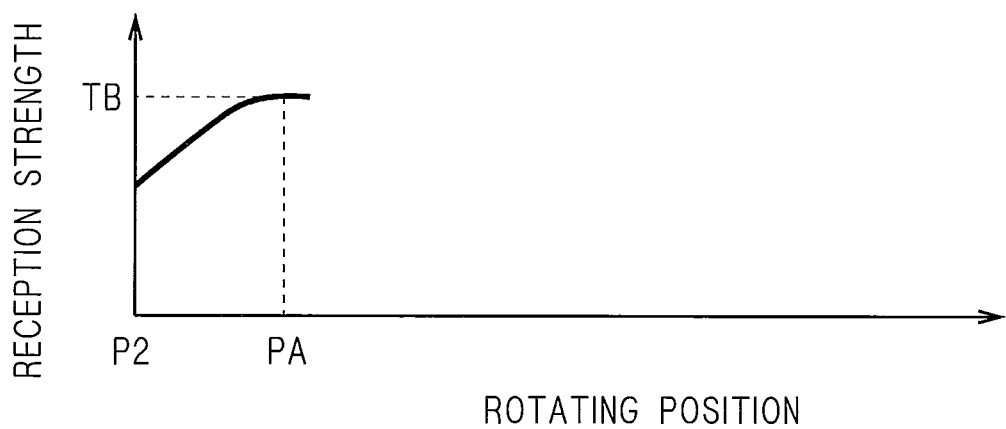
FIG. 4B is a view showing the reception strength of the wireless signal in the reception section 11 during the time when a mounting section 3 is rotated in a rotating direction corresponding to the maximum reception strength θB detected at the time of the main operation.

In Steps S13 to S15, as the main operation (second main operation M2), the control section 13 returns the rotational position of the mounting section 3 as in FIG. 4B such that the reception strength of the reception section 11 is the maximum reception strength PB, thereby the mounting section 3 is rotated to the rotational position PB. In this manner, the display unit 5 is automatically rotated in the direction to the remote control unit 9.

FIGS. 6A and 6B show examples of respective output voltages of the driver 13d for clockwise/counterclockwise rotation and the driver 13c for forward/backward rotation when the initial operation and the main operation are performed as in FIG. 2 (in the case of PWM (Pulse Width Modulation) drive). By setting amplitudes Va, Vb of the respective output voltages so as to satisfy Formula 1, the rotation of the mounting section 3 at the time of the initial operation D2 can be set to the cyclical rotation.

$$Va \times (\text{torque constant of electric motor for clockwise/counterclockwise rotation}) \times (\text{speed reduction ratio of first stage to last stage in the clockwise/counterclockwise rotating mechanism}) \times (\text{moment of inertia in clockwise/counterclockwise rotating direction of display unit 5 and mounting section 3}) = Vb \times (\text{torque constant of electric motor for forward/backward rotation}) \times (\text{speed reduction ratio of first stage to last stage in the forward/backward rotating mechanism}) \times (\text{moment of inertia in forward/backward rotating direction of display unit 5 and mounting section 3})$$

Formula 1

It is to be noted that, while FIGS. 6A and 6B show the output voltages of the respective drivers 13c, 13d in the case where the respective drivers 13c and 13d PWM-drive the electric motor for forward/backward rotation and the electric motor for clockwise/counterclockwise rotation of the electric rotating mechanism 7, the output voltages of the respective drivers 13c, 13d in the case of changing magnitudes of the output voltages to drive the respective electric motors in place of PWM-driving the motors are as in FIGS. 7A and 7B.

According to the turntable 1 for a display unit as thus configured, when a wireless signal from the remote control unit 9 is received in the reception section 11, as an initial operation, a reception strength of the wireless signal in the reception section 11 is detected while the mounting section 3 is cyclically rotated around a predetermined rotational position through the electric rotating mechanism 7, to detect a rotational position at which the reception strength is maximum among the detected results, and as the main operation, the reception strength of the wireless signal in the reception section 11 is detected while the mounting section 3 is rotated in the extending direction from the predetermined rotational position to the rotational position at which the reception strength is maximum, to detect a rotational position at which the reception strength is maximum among the detected results, and the mounting section 3 is rotated to the rotational position at which the reception strength is maximum. It is thereby possible to automatically adjust the orientation of the display unit 5 in the direction to the remote control unit 9 (thus, a direction to the operator of the display unit 5).

Further, the propagation direction of the wireless signal from the remote control unit 9 is detected using one reception section 11, thereby enabling reduction in manufacturing cost.

Further, the propagation direction of the wireless signal from the remote control unit 9 is schematically detected by the initial operation and the mounting section 3 is rotated in the propagation direction by the main operation, thereby enabling prevention of unnecessary rotation of the mounting section 3 (thus, the display unit 5), to promptly rotate the display unit 5 in the direction to the operator.

Further, the mounting section 3 is cyclically rotated around a predetermined rotational position by the initial operation, thereby enabling detection of the propagation direction of the wireless signal from the remote control unit with respect to each of the forward/backward and clockwise/counterclockwise rotating directions.

Further, upon receipt of the wireless signal from the remote control unit 9, the control section 13 returns the rotational state of the mounting section 3 to the neutral position, and then makes the mounting section 3 perform the initial operation, thereby enabling appropriate reception with respect to any direction at the time of the initial operation.

Embodiment 2

Figure 8:
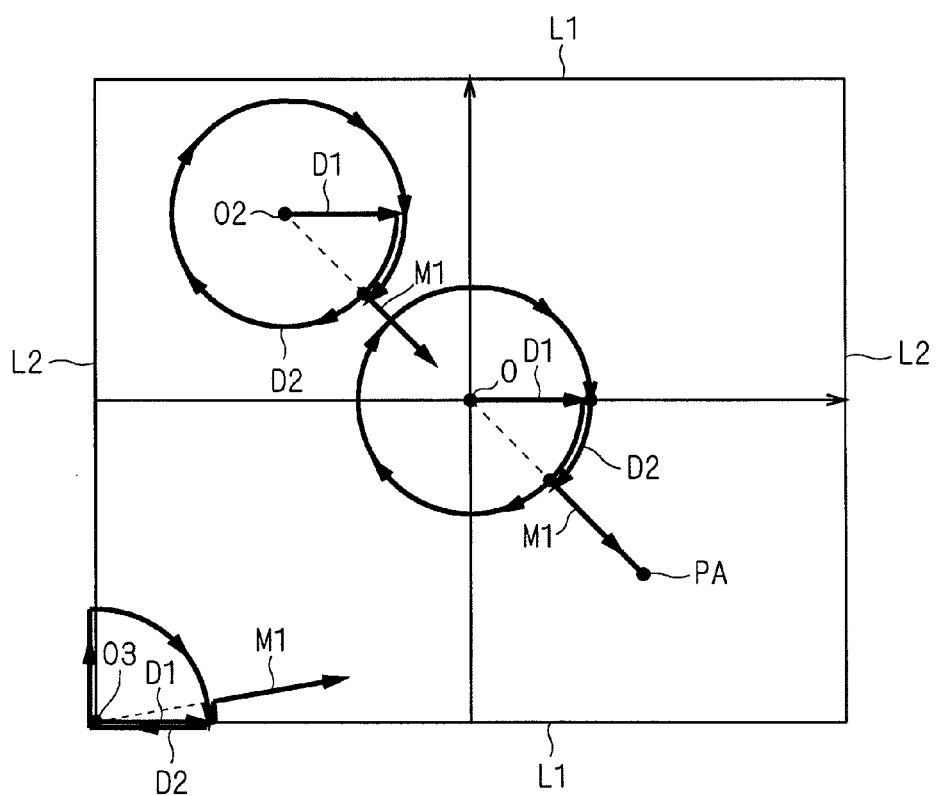
FIG. 8 is a view schematically showing an operation of a turntable 1B for a display unit according to Embodiment 2 (that is an operation of the turntable for a display unit in a case where the initial operation is started from a rotational position at reception of the wireless signal (automatic rotation signal)).

In Embodiment 1, as in FIG. 8, upon receipt of the wireless signal (automatic rotation signal) from the remote control unit 9, the rotational state of the mounting section 3 is returned to the neutral position O and the mounting section 3 is then cyclically rotated taking the neutral position O as the center. However, the rotational state of the mounting section 3 may not be returned to the neutral position O, but may be cyclically rotated taking as the center a rotational position O2 at reception of the wireless signal (automatic rotation signal) from the remote control unit 9.

It is to be noted that in the case of performing such, when the rotational position at reception of the wireless signal (automatic rotation signal) from the remote control unit 9 is on a limit line L1 in the forward/backward rotating direction or in a limit line L2 in the clockwise/counterclockwise rotating direction, as is a point O3 in FIG. 8, the rotation of the mounting section 3 is not in the shape of a perfect circle, but in the shape of a defective circle due to each of the limit lines L1, L2.

According to the turntable 1B for a display unit as thus configured, upon receipt of the wireless signal from the remote control unit 9, the control section 13 returns the rotational state of the mounting section 3 to the neutral position, and then makes the mounting section 3 perform the initial operation, whereby it is possible to appropriately receive the signal with respect to any direction at the time of the initial operation.

Embodiment 3

In Embodiment 1, for example in a case where the wireless signal from the remote control unit 9 is cut off by a person or the like halfway through the initial operation, to cause the reception strength of the wireless signal in the reception section 11 to fall below a predetermined value T1, the initial operation may be stopped, and upon re-receipt of the wireless signal (automatic rotation signal) from the remote control unit 9 in the reception section 11, the rotation of the mounting section 3 as the initial operation may be restarted from the rotational position at the time of the stoppage, for performing the remaining initial operation.

Figure 9:
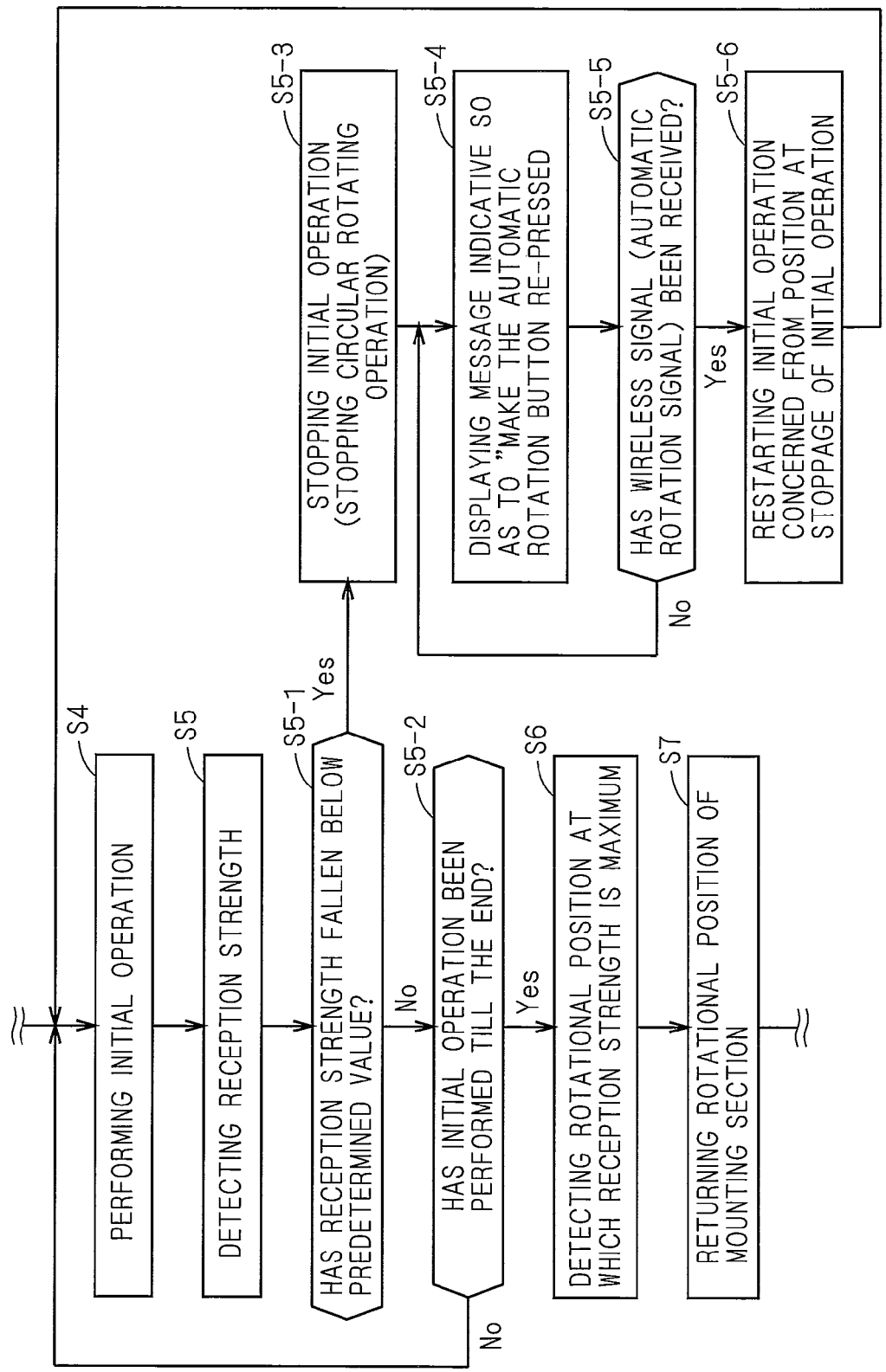
FIG. 9 is a flowchart of an operation of a turntable for a display unit according to Embodiment 3 (that is an operation in a case where the wireless signal received in the reception section 11 is cut off by an obstacle such as a person).

An operation of a turntable 1C for a display unit in this case is described based upon FIG. 9.

In Steps S4, S5, as in Embodiment 1, as the initial operation, the control section 13 detects a reception strength of the wireless signal received in the reception section 11 while cyclically rotating the mounting section 3 with the neutral position taken as the center through the electric rotating mechanism 7.

In Step S5-1, the control section 13 determines whether or not the reception strength of the wireless signal received in the reception section 11 has fallen below the predetermined value T1. As a result of the determination, when the reception strength has not fallen below the predetermined value T1, the process goes to Step S5-2, and the control section 13 further determines whether or not the mounting section 3 has been rotated until the end of the cyclical rotation. Then, as a result of the determination, when the rotation has not been performed until the end of the cyclical rotation, the process returns to Step S4, and when the rotation is performed until the end of the cyclical rotation, the process sequentially goes to Step S6 and after, and the processing as in the case of Embodiment 1 is performed.

Figure 10:
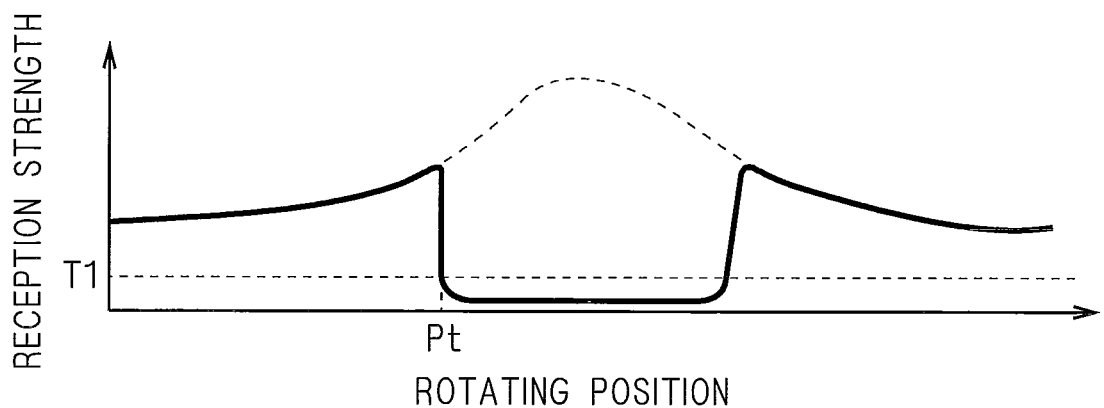
FIG. 10 is a view showing an example of the reception strength of the reception section 11 in the case where the wireless signal received in the reception section 11 is cut off by an obstacle such as a person.

As a result of the determination in Step S5-1, when the reception strength of the wireless signal received in the reception section 11 falls below the predetermined value T1, the process goes to Step S5-3, and the control section 13 stops the rotation of the mounting section 3 as the initial operation. For example, as in FIG. 10, when determining that the reception strength fell below the predetermined value at the time of the rotational position of the mounting section 3 being "Pt", the control section 13 stops the turntable of the mounting section 3 at the rotational position Pt.

In Step S5-4, a message indicative so as to make the automatic rotation button re-pressed is displayed on a screen of the display unit 5. It is to be noted that this message is stored in a predetermined storage section, and read by the control section 13 from the predetermined storage section and overlapped and displayed on the display screen of the display unit 5 through a predetermined image synthesizing section provided in the display unit 5.

In Step S5-5, the control section 13 determines whether or not the wireless signal (automatic rotation signal) from the remote control unit 9 has been received in the reception section 11. As a result of the determination, when the signal has not been received, the process returns to Step S5-4 and the message continues to be displayed. On the other hand, when the signal is received, the process goes to Step S5-6, and the control section 13 restarts the cyclical rotation of the mounting section 3 as the initial operation from the rotational position Pt at the time of the stoppage, while simultaneously stopping the display of the message. The process then returns to Step S4, and the control section 13 performs the remaining rotating operation of the cyclical rotation of the mounting section 3 as the initial operation.

According to the turntable 1C for a display unit as thus configured, when the reception strength falls below the predetermined value T1 halfway through the initial operation, the control section 13 stops the initial operation, thereby allowing prevention of erroneous detection in the propagation direction of the wireless signal from the remote control unit 9.

Further, when stopping the initial operation, upon receipt of the wireless signal from the remote control unit 9 in the reception section 11, the control section 13 restarts the rotation of the mounting section 3 as the initial operation from the rotational position Pt at the time of the stoppage, thereby enabling prompt completion of the initial operation after the restart.

It is to be noted that in the present embodiment, in step S5-6, the cyclical rotation of the mounting section 3 as the initial operation is restarted from the rotational position Pt at the time of the stoppage, but the rotation may be restarted from the start of the initial operation (e.g. from the start position P1 of the cyclical rotation). In such a manner, it is possible to prevent erroneous detection of the wireless signal from the remote control unit 9 in the propagation direction.

Embodiment 4

Figure 11:
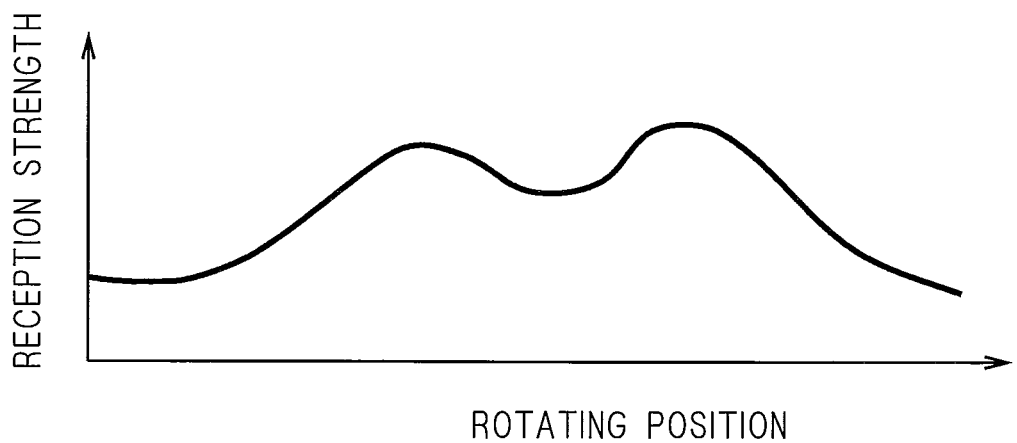

In Embodiment 1, for example when the remote control unit 9 is shaken halfway through the initial operation to cause detection of a plurality of maximum values in regard to the reception strength of the wireless signal in the reception section 11 as in FIG. 11, the initial operation may be stopped, and upon re-receipt of the wireless signal (automatic rotation signal) from the remote control unit 9 in the reception section 11, the initial operation may be restarted from the start.

In FIG. 9, the operation of the turntable 1D for a display unit in this case may be an operation with the content of the operation of Step S5-1 replaced by the content of the operation that "it is determined by the control section 13 as to whether or not a plurality of maximum values have been detected in regard to the reception strength of the wireless signal received in the reception section 11", and also with the content of the operation of Step S5-6 replaced by the content of the operation that "the cyclical rotation of the mounting section 3 is restarted as the initial operation from the start of the initial operation (e.g. from the start position P1 of the cyclical rotation)".

According to the turntable 1D for a display unit as thus configured, since the control section 13 stops the initial operation when detecting a plurality of maximum values in regard to the reception strength halfway through the initial operation, it is possible to prevent erroneous detection in the propagation direction of the wireless signal from the remote control unit 9.

Further, when stopping the initial operation, the control section 13 restarts the initial operation from the start upon re-receipt of the wireless signal from the remote control unit 9 in the reception section 11, and it is thereby possible to prevent erroneous detection in the propagation direction of the wireless signal from the remote control unit 9.

Embodiment 5

Figure 12A:
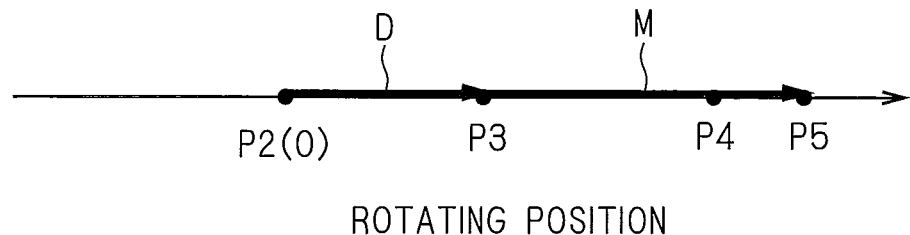
FIG. 12A is a view schematically showing an example of an operation of a turntable 1E for a display unit according to Embodiment 5.

In Embodiment 1, the mounting section 3 is cyclically rotated around the predetermined rotational position in the initial operation. However, in the present embodiment, the mounting section 3 is rotated by a fixed length along a predetermined direction in the initial operation. In the following, a turntable 1E for a display unit according to the present embodiment is described based upon FIGS. 1, 12 and 13. Below, the same constitutional components as those in Embodiment 1 are provided with the same numerals, descriptions of those components are omitted, and only different points are described.

Figure 12B:
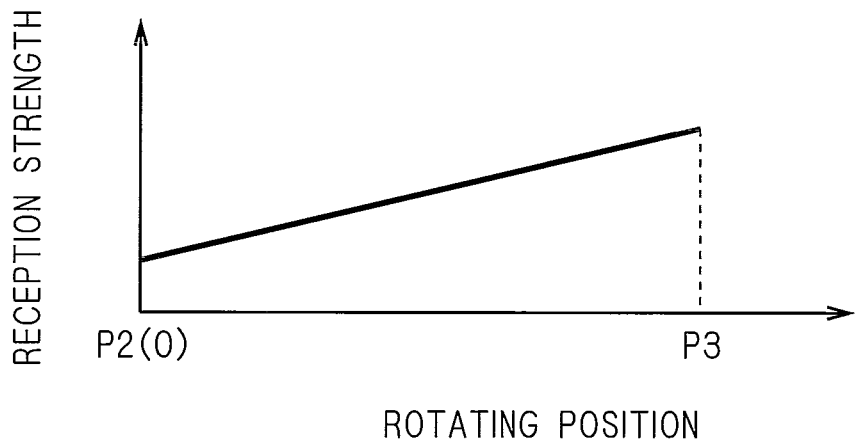
FIG. 12B is a view showing the reception strength of the wireless signal in the reception section 11 during the initial operation of FIG. 12A.
Figure 13A:
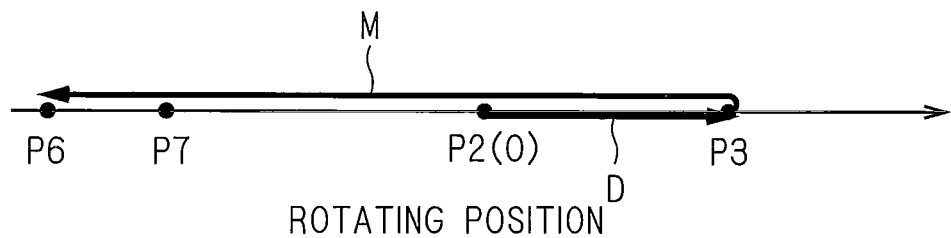
FIG. 13A is a view schematically showing another example of an operation of a turntable 1E for a display unit according to Embodiment 5.
Figure 13B:
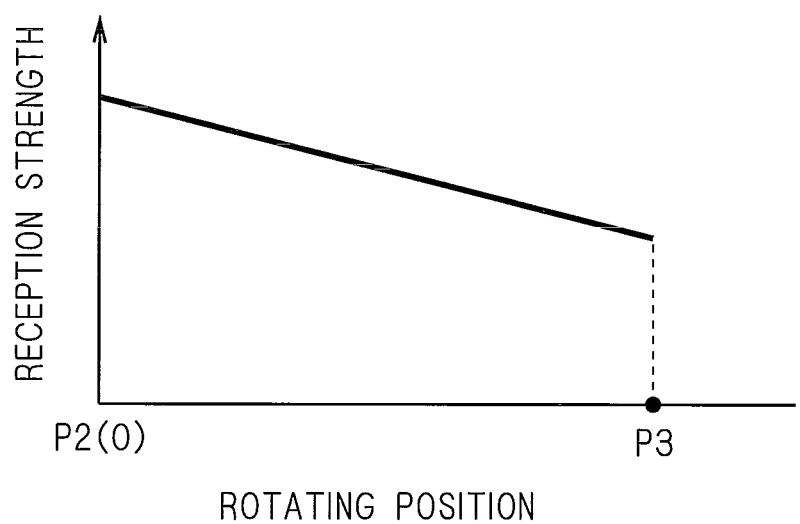
FIG. 13B is a view showing the reception strength of the wireless signal in the reception section 11 during the initial operation of FIG. 13A.
Figure 13C:
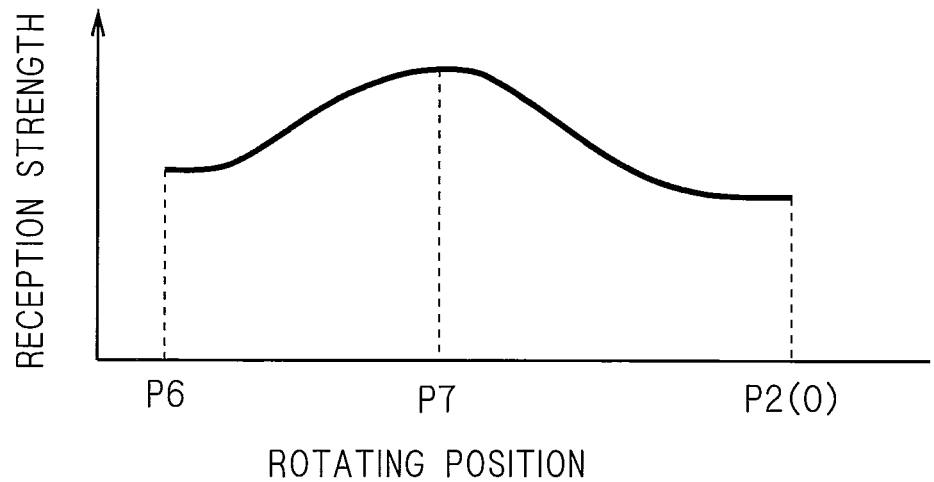
FIG. 13C is a view showing the reception strength of the wireless signal in the reception section 11 during the main operation of FIG. 13A.

A central processing unit 13eB of the present embodiment is one obtained by modifying the initial operation and the main operation of the central processing unit 13e of Embodiment 1 in the following manner. That is, for example as in FIG. 12A, as an initial operation D, the central processing unit 13eB detects, for example as in FIG. 12B, a reception strength of the wireless signal (automatic rotation signal) in the reception section 11 based upon an output signal of the detection section 13a while controlling the electric rotating mechanism 7 through each of the drivers 13c, 13d, to rotate the mounting section 3 from a start position P2 (here, this start position P2 is consistent with the neutral position O) to an end position P3 along a predetermined direction (e.g. clockwise/counterclockwise rotating direction) within a predetermined range, to detect at which position between the both end positions P2, P3 of the rotation the reception strength is maximum. FIG. 12B illustrates a case where the reception strength is maximum when the mounting section 3 is at the end position P3.

Figure 12C:
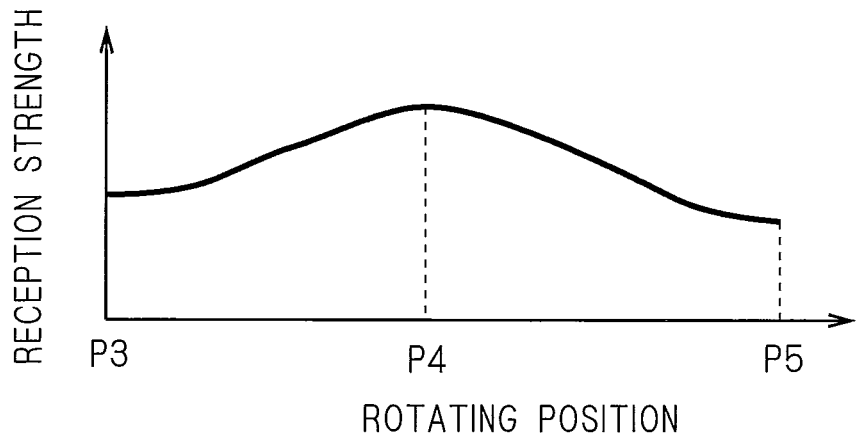
FIG. 12C is a view of the reception strength of the wireless signal in the reception section 11 during the main operation of FIG. 12A.

Subsequently, for example as in FIG. 12A, as a main operation M, the central processing unit 13eB detects, for example as in FIG. 12C, a reception strength of the wireless signal in the reception section 11 based upon a processing signal of the detection section 13a while further rotating the mounting section 3 along the predetermined direction (e.g. clockwise/counterclockwise rotating direction) to one side of the both end position P2, P3 sides, at which the reception strength is maximum (the end position P3 in FIG. 12B), to detect a rotational position P4 at which the reception strength is maximum among the detected results, and rotates the mounting section 3 to the rotational position P4 at which the reception strength is maximum. It is to be noted that in the main operation M, the rotation is performed until detection of the maximum reception strength or until completion of as much rotation as possible in the predetermined direction (e.g. to a rotational position P5).

The following should be noted. FIG. 12 illustrates the initial operation D and the main operation M in the case of the reception strength being maximum at the end position P3. However, in the case as in FIG. 13B where the reception strength is maximum at the start position P2, as in FIG. 13A, as the main operation M, the central processing unit 13eB detects, for example as in FIG. 13C, a reception strength of the wireless signal in the reception section 11 is detected based upon an output signal of the detection section 13a while further rotating the mounting section 3 along the predetermined direction (e.g. clockwise/counterclockwise direction) to the start position P2 side, to detect a rotational position P7 at which the reception strength is maximum among the detected results, and rotates the mounting section 3 to the rotational position P7 at which the reception strength is maximum. It is to be noted that a rotational position P6 is a position from which the rotation can be performed as much as possible in the predetermined direction of the main operation M.

The operation of the turntable 1E for a display unit according to the present embodiment is the same as the operation of the turntable for a display unit according to Embodiment 1 (FIG. 5) except for the above-mentioned initial operation and main operation, and hence its description is not repeated.

According to the turntable 1E for a display unit as thus configured, when the wireless signal from the remote control unit 9 is received in the reception section 11, as the initial operation, a reception strength of the wireless signal in the reception section 11 is detected while the mounting section 3 is rotated by a fixed length through the electric rotating mechanism 7 along a predetermined direction, to detect at which position between both end positions of the rotation the reception strength is maximum, and as the main operation, the reception strength of the wireless signal in the reception section 11 is detected while the mounting section 3 is further rotated along the predetermined direction to one side of the both end position sides, at which the reception strength is maximum, to detect a rotational position at which the reception strength is maximum among the detected results, and the mounting section 3 is rotated to the rotational position at which the reception strength is the maximum, whereby it is possible to automatically adjust the orientation of the display unit 5 in the direction to the remote control unit 9 (thus, the direction to the operator of the display unit 5).

Further, the propagation direction of the wireless signal from the remote control unit 9 is detected using one reception section 11, thereby enabling reduction in manufacturing cost.

Further, the propagation direction of the wireless signal from the remote control unit 9 is schematically detected by the initial operation, and the mounting section 3 is rotated in the propagation direction by the main operation, thereby enabling prevention of unnecessary rotation of the mounting section 3 (thus, the display unit 5), to promptly rotate the display unit 5 in the direction to the operator.

Further, the mounting section is rotated along the predetermined direction (here, the clockwise/counterclockwise rotating direction) in the initial operation, thereby enabling detection of the propagation direction of the wireless signal from the remote control unit 9 with respect to the predetermined direction (clockwise/counterclockwise rotating direction).

It is to be noted that, also in the present embodiment, as in Embodiment 2, upon receipt of the wireless signal (automatic rotation signal) from the remote control unit 9, the rotational state of the mounting section 3 may not be returned to the neutral position O, but the mounting section 3 may be rotated with a rotational position O2 at the time of reception of the wireless signal (automatic rotation signal) from the remote control unit 9 as the starting position of the initial operation.

Embodiment 6

In Embodiment 1, the propagation direction of the wireless signal from the remote control unit 9 is detected using one reception section 11. However, in the present embodiment, a plurality of reception sections are used to detect the propagation direction of the wireless signal from the remote control unit 9. It is to be noted that the same constitutional components as those in Embodiment 1 are provided with the same numerals, descriptions of those components are not repeated, and only different points are described.

As in FIG. 14, a turntable 1F for a display unit according to the present embodiment includes: the mounting section 3; the display unit 5 mounted on the display unit 5; the electric rotating mechanism 7 that rotates the mounting section 3; the remote control unit 9 that transmits a wireless signal (e.g. infrared signal); a plurality of (e.g. three) reception sections 11a, 11b, 11c, each of which is installed in the mounting section 3 or the display unit 5 and receives a wireless signal from the remote control unit 9; and a control section 13F that controls the electric rotating mechanism 7 based upon the wireless signals received in the reception sections 11a, 11b, 11c.

Here, the reception section 11a is installed at the center of the upper portion of the front surface of the display unit 5, the reception sections 11b, 11c are respectively installed at both the right and left ends of the lower portion of the display unit 5. It is to be noted that the reception section 11a is installed at the center of the lower portion of the front surface of the display unit 5, the reception sections 11b, 11c are respectively installed at both the right and left ends of the upper portion of the display unit 5.

The control section 13F includes: detection sections 13Fa, 13Fb, 13Fc that detect wireless signals received in the respective reception sections 11a, 11b, 11c; a comparison section 13Fe that compares output signals of the respective detection sections 13Fb, 13Fc; the addition section 13Ff that adds up the output signals of the detection sections 13Fb, 13Fc; a halving section 13Fg that halves an output value of the addition section 13Ff; a comparison section 13Fh that compares output signal of the halving section 13Fg and the output signal of the detection section 13Fa; a driver 13c for forward/backward rotation which controls the forward/backward rotating mechanism of the electric rotating mechanism 7; a driver 13d for clockwise/counterclockwise rotation which controls the clockwise/counterclockwise rotating mechanism of the electric rotating mechanism 7; and a central processing unit (CPU) 13Fi that controls the respective drivers 13c, 13d based upon output signals of the respective comparison sections 13Fe, 13Fh.

The comparison section 13Fe, for example, outputs an H (high-level) signal when the output signal of the detection section 13Fc is higher between the output signals of the detection sections 13Fb, 13Fc, and outputs an L (low-level) signal when the output signal of the detection section 13Fb is higher therebetween. The comparison section 13Fh, for example, outputs an H-signal when the output signal of the detection section 13Fa is higher between the output signals of the detection section 13Fa and the halving section 13Fg, and outputs an L-signal when the output signal of the halving section 13Fg is higher therebetween.

The central processing unit 13Fi detects the propagation direction of a wireless signal received in each of the reception sections 11a to 11c based upon the output signal of each of the comparison sections, 13Fe, 13Fh, and controls the clockwise/counterclockwise rotating mechanism and the forward/backward rotating mechanism of the electric rotating mechanism 7 in the propagation direction through the respective drivers 13c, 13d, to rotate the mounting section 3.

More specifically, with respect to the clockwise/counterclockwise rotating direction, the central processing unit 13Fi regards a change point at which the output signal of the comparison section 13Fe changes from the L-signal to the H-signal, or a change point at which the comparison section 13Fe changes from the H-signal to the L-signal, as a point in the propagation direction of the wireless signal with respect to the clockwise/counterclockwise rotating direction, and controls the clockwise/counterclockwise rotating mechanism of the electric rotating mechanism 7, to rotate the mounting section 3 in the clockwise/counterclockwise rotating direction to a position at which the change point is obtained, That is, in the case of the output signal of the comparison section 13Fe being the H-signal (L-signal), the mounting section 3 is rotated clockwise (counterclockwise) until the output signal of the comparison section 13Fe changes to the L-signal (H-signal). Thereby, with respect to the clockwise/counterclockwise rotating direction, the display unit 5 is rotated in the propagation direction of the wireless signal from the remote control unit 9.

With respect to the forward/backward rotating direction, the central processing unit 13Fi regards a change point at which the output signal of the comparison section 13Fh changes from the L-signal to the H-signal, or a change point at which the comparison section 13Fh changes from the H-signal to the L-signal, as a point in the propagation direction of the wireless signal with respect to the forward/backward rotating direction, and controls the forward/backward rotating mechanism of the electric rotating mechanism 7, to rotate the mounting section 3 in the forward/backward rotating direction to a position at which the change point is obtained. That is, in the case of the output signal of the comparison section 13Fh being the H-signal (L-signal), the mounting section 3 is rotated backward(forward) until the output signal of the comparison section 13Fh changes to the L-signal (H-signal). Thereby, with respect to the forward/backward rotating direction, the display unit 5 is rotated in the propagation direction of the wireless signal from the remote control unit 9.

Next, an operation of this turntable 1F for a display unit is described.

In this turntable 1F for a display unit, by pressing the automatic rotation button provided on the remote control unit 9, the display unit 5 is automatically rotated in the direction to the remote control unit 9 in the following manner.

When the automatic rotation button on the remote control unit 9 is long-pressed toward the turntable 1F for a display unit, the wireless signal from the remote control unit 9 continues to be transmitted toward the turntable 1F for a display unit. The wireless signal is received in the reception sections 11a to 11c of the turntable 1F for a display unit, and the control section 13F of the turntable 1F for a display unit then rotates the mounting section 3 counterclockwise (clockwise) through the electric rotating mechanism 7 until the output signal of the comparison section 13Fe changes from the H-signal (L-signal) to the L-signal (H-signal), and also rotates the mounting section 3 backward (forward) through the electric rotating mechanism 7 until the output signal of the comparison section 13Fh changes from the H-signal (L-signal) to the L-signal (h-signal). In such a manner, the mounting section 3 (thus, the display unit 5) is automatically rotated in the direction to the remote control unit 9.

According to the turntable 1F for a display unit as thus configured, the propagation direction of the wireless signal is detected based upon the reception strength of each of the plurality of reception sections 11a to 11c, and the mounting section 3 is rotated in the propagation direction through the electric rotating mechanism 7, and it is thereby possible to automatically adjust the orientation of the display unit 5 in the direction to the remote control unit 9 (thus, the direction to the operator of the display unit 5).

Further, the plurality of reception sections 11a to 11c are three reception sections respectively installed at the center of one of the upper portion and the lower portion of the front surface of the display unit 5 and at both the right and left ends of the other, and it is thereby possible to detect the propagation direction of the wireless signal from the remote control unit 9 with respect to each of the forward/backward and clockwise/counterclockwise rotating directions.

In addition, while the turntable for a display unit is described in each of Embodiments 1 to 6 above, it is assumed that a controlling method therefor is also included in each of the embodiments.

While the invention has been shown and described in detail, the foregoing description is in all aspects illustrative and not restrictive. It is therefore understood that numerous modifications and variations can be devised without departing from the scope of the invention.

What is claimed is:

1. A system comprising:
    a turntable for a display unit, comprising:
        a mounting section that is mounted with a display unit, and
        an electric rotating mechanism that rotates said mounting section, wherein rotation by said electric rotating mechanism has a limit in each of forward and backward rotation around a horizontal axis, and a limit in each of clockwise and counter-clockwise rotation around a vertical axis;
    a remote control unit that transmits a wireless signal;
    a reception section that is installed in said mounting section or said display unit, and receives a wireless signal from said remote control unit; and
    a control section that controls said electric rotating mechanism based upon said wireless signal received in said reception section,
    wherein, upon receipt of a wireless signal from said remote control unit in said reception section, said control section performs:
        an initial operation in which said control section detects a reception strength of said wireless signal in said reception section while cyclically rotating said mounting section about a predetermined range defined in terms of boundaries of forward/backward rotation around the horizontal axis and clockwise/counterclockwise rotation around the vertical axis, said boundaries being within the rotation limits of said electric rotating mechanism, around a predetermined rotational position through said electric rotating mechanism, to determine a first rotational position at which said reception strength is maximum among the detected results of the initial operation, wherein the rotation of the mounting section during the initial operation is not dependent on detection of the reception strength, and
        a main operation in which said control section returns the rotational position of said mounting section to said first rotational position, further rotates said mounting section from said first rotational position in a main rotation direction extending from said predetermined rotational position to said first rotational position until the rotational position of said mounting section reaches either the forward/backward limit or the clockwise/counter-clockwise limit while detecting the reception strength of said wireless signal in said reception section, wherein after the rotational position of said mounting section is returned to said first rotational position, the direction of rotation of said mounting section during the main operation is limited to the main rotation direction, determines a second rotational position at which said reception strength is maximum among the detected results of the main operation, and rotates said mounting section to the second rotational position.

2. A system comprising:
    a turntable for a display unit, comprising:
        a mounting section that is mounted with a display unit, and
        an electric rotating mechanism that rotates said mounting section around a vertical axis, wherein rotation by said electric rotating mechanism has a limit in each of clockwise and counter-clockwise rotation around the vertical axis;
    a remote control unit that transmits a wireless signal;
    a reception section that is installed in said mounting section or said display unit, and receives a wireless signal from said remote control unit; and
    a control section that controls said electric rotating mechanism based upon said wireless signal received in said reception section,
    wherein, upon receipt of a wireless signal from said remote control unit in said reception section, said control section performs:
        an initial operation in which said control section detects a reception strength of said wireless signal in said reception section while rotating said mounting section from a predetermined start position by a fixed length around the vertical axis along a predetermined one of the clockwise and counter-clockwise directions to a predetermined end position through said electric rotating mechanism, a range defined by said predetermined start and end positions being within the rotation limits of said electric rotating mechanism in the clockwise and counter-clockwise directions, to determine at which of the start and end positions of the rotation of the initial operation said reception strength is higher, wherein the rotation of the mounting section during the initial operation is limited to said range defined by said start and end positions, and is not dependent on detection of the reception strength, and
        a main operation in which:
            if the end position of the rotation of the initial operation is determined to have a higher reception strength, said control section further rotates said mounting section around the vertical axis from said end position in said predetermined one of the clockwise and counter-clockwise directions beyond said predetermined end position while detecting the reception strength of said wireless signal in said reception section, determines an optimal rotational position at which said reception strength is maximum among the detected results of the main operation, and rotates said mounting section to said optimal rotational position, and
            if the start position of the rotation of the initial operation is determined to have a higher reception strength, said control section returns said rotational position of said mounting section to said start position, further rotates said mounting section around the vertical axis from said start position in an opposite direction of said predetermined one of the clockwise and counter-clockwise directions while detecting the reception strength of said wireless signal in said reception section, determines an optimal rotational position at which said reception strength is maximum among the detected results of the main operation, and rotates said mounting section to said optimal rotational position, wherein, during said main operation, said control section rotates said mounting section beyond the range defined by said start and end positions.

3. The system according to claim 2, wherein said predetermined direction is a clockwise/counterclockwise rotating direction.

4. The system according to claim 1, wherein, upon receipt of said wireless signal from said remote control unit, said control section returns the rotational state of said mounting section to a neutral position, and then makes said mounting section perform said initial operation.

5. The system according to claim 2, wherein, upon receipt of said wireless signal from said remote control unit, said control section returns the rotational state of said mounting section to a neutral position, and then makes said mounting section perform said initial operation.

6. The system unit according to claim 1, wherein said control section stops said initial operation when said reception strength falls below a predetermined value halfway through said initial operation.

7. The system unit according to claim 2, wherein said control section stops said initial operation when said reception strength falls below a predetermined value halfway through said initial operation.

8. The system unit according to claim 1, wherein said control section stops said initial operation when detecting a plurality of maximum values in regard to said reception strength halfway through said initial operation.

9. The system unit according to claim 2, wherein said control section stops said initial operation when detecting a plurality of maximum values in regard to said reception strength halfway through said initial operation.

10. The system unit according to claim 6, wherein, when stopping said initial operation, said control section restarts the rotation of said mounting section as said initial operation from the rotational position at the time of the stoppage upon re-receipt of the wireless signal from said remote control unit in said reception section.

11. The system unit according to claim 7, wherein, when stopping said initial operation, said control section restarts the rotation of said mounting section as said initial operation from the rotational position at the time of the stoppage upon re-receipt of the wireless signal from said remote control unit in said reception section.

12. The system unit according to claim 6, wherein, when stopping said initial operation, said control section restarts said initial operation from the start upon re-receipt of the wireless signal from said remote control unit in said reception section.

13. The system unit according to claim 7, wherein, when stopping said initial operation, said control section restarts said initial operation from the start upon re-receipt of the wireless signal from said remote control unit in said reception section.

14. The system unit according to claim 8, wherein, when stopping said initial operation, said control section restarts said initial operation from the start upon re-receipt of the wireless signal from said remote control unit in said reception section.

15. The system unit according to claim 9, wherein, when stopping said initial operation, said control section restarts said initial operation from the start upon re-receipt of the wireless signal from said remote control unit in said reception section.

16. A method for controlling a turntable for a display unit, comprising the steps of:
(a) detecting reception of a wireless signal from a remote control unit in a reception section installed in a mounting section that is rotatable by an electric rotating mechanism or a display unit mounted on said mounting section, wherein rotation by said electric rotating mechanism has a limit in each of forward and backward rotation around a horizontal axis, and a limit in each of clockwise and counter-clockwise rotation around a vertical axis;
(b) as an initial operation, detecting a reception strength of said wireless signal in said reception section while cyclically rotating said mounting section about a predetermined range defined in terms of boundaries of forward/backward rotation around the horizontal axis and clockwise/counterclockwise rotation around the vertical axis, said boundaries being within the rotation limits of said electric rotating mechanism, around a predetermined rotational position through said electric rotating mechanism, to determine a first rotational position at which said reception strength is maximum among the detected results of the initial operation, wherein the rotation of the mounting section during the initial operation is not dependent on detection of the reception strength; and
(c) as a main operation, returning the rotational position of said mounting section to said first rotational position, further rotating said mounting section from said first rotational position in a main rotation direction extending from said predetermined rotational position to said first rotational position until the rotational position of said mounting section reaches either the forward/backward limit or the clockwise/counter-clockwise limit while detecting the reception strength of said wireless signal in said reception section, wherein after the rotational position of said mounting section is returned to said first rotational position, the direction of rotation of said mounting section during the main operation is limited to the main rotation direction, determining a second rotational position at which said reception strength is maximum among the detected results of the main operation, and rotating said mounting section to the second rotational position.

17. A method for controlling a turntable for a display unit, comprising the steps of:
(a) detecting reception of a wireless signal from a remote control unit in a reception section installed in a mounting section that is rotatable by an electric rotating mechanism around a vertical axis or a display unit mounted on said mounting section, wherein rotation by said electric rotating mechanism has a limit in each of clockwise and counter-clockwise rotation around the vertical axis;
(b) as an initial operation, detecting a reception strength of said wireless signal in said reception section while rotating said mounting section from a predetermined start position by a fixed length around the vertical axis along a predetermined one of the clockwise and counter-clockwise directions to a predetermined end position through said electric rotating mechanism, a range defined by said predetermined start and end positions being within the rotation limits of said electric rotating mechanism in the clockwise and counter-clockwise directions, to determine at which of the start and end positions of the rotation of the initial operation said reception strength is higher, wherein the rotation of the mounting section during the initial operation is limited to said range defined by said start and end positions, and is not dependent on detection of the reception strength; and
(c) as a main operation,
if the end position of the rotation of the initial operation is determined to have a higher reception strength, further rotating said mounting section around the vertical axis from said end position in said predetermined one of the clockwise and counter-clockwise directions beyond said predetermined end position while detecting the reception strength of said wireless signal in said reception section, determining an optimal rotational position at which said reception strength is maximum among the detected results of the main operation, and rotating said mounting section to the optimal rotational position, and if the start position of the rotation of the initial operation is determined to have a higher reception strength, returning said rotational position of said mounting section to said start position, further rotating said mounting section around the vertical axis from said start position in an opposite direction of said predetermined one of the clockwise and counter-clockwise directions while detecting the reception strength of said wireless signal in said reception section, determining an optimal rotational position at which said reception strength is maximum among the detected results of the main operation, and rotating said mounting section to said optimal rotational position, wherein, during said main operation, said control section rotates said mounting section beyond the range defined by said start and end positions.

* * * * *